United States Patent Office 2,950,710
Patented Aug. 30, 1960

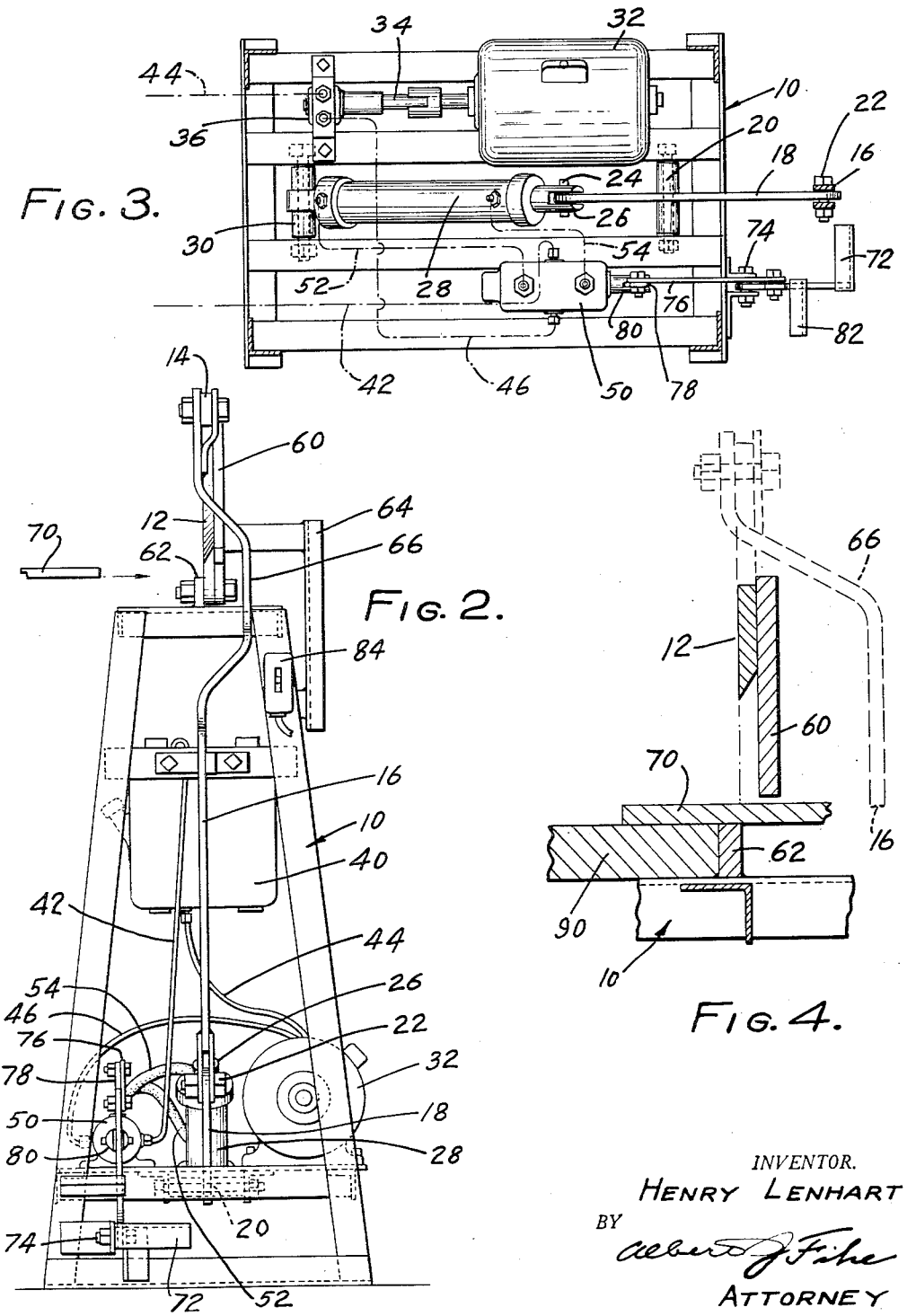

2,950,710

SLATE TRIMMER

Henry Lenhart, 714 Superba Ave., Venice, Calif.

Filed Aug. 7, 1959, Ser. No. 832,296

3 Claims. (Cl. 125—23)

This invention relates to an improved slate trimmer and has for one of its principal objects the provision of a device of the class described which will enable the simple, accurate and efficient cutting and trimming of pieces of slate or the like into desired shapes and sizes and with a minimum of effort and at a great saving of time and labor.

One of the important objects of this invention is to provide a slate cutting and trimming machine which has all the advantages of accuracy and flexibility of a hand-operated machine, but which is power operated and in such a manner that the user has both hands free to move the slate into proper position for cutting and then to shift and remove the same while, simultaneously, the foot or feet of the operator are used to control the cutting and trimming movements.

A still further important object of the invention is to provide, in a slate trimmer, a combination of an electric motor or gas engine operating a pump which, in turn, moves hydraulic fluid into and out of a cylinder and piston combination connected to the cutting blade.

Yet another important object resides in the provision of a power-operated slate trimming machine which is so constructed that slabs or pieces of slate or the like of various and even relatively large dimensions can be readily handled, cut and shaped with great facility.

Other and further important objects of the invention will be apparent from the disclosures in the accompanying drawings and following specification.

The invention, in a preferred form, is illustrated in the drawings and hereinafter more fully described.

In the drawings:

Figure 2 is an end elevation of the machine of Figure 1, taken from the right-hand side of Figure 1 and illustrating certain important details.

Figure 3 is a horizontal section, taken on the plane of the line 3—3 of Figure 1, looking downwardly.

Figure 4 is a detail section on the plane of the line 4—4 of Figure 1, looking in the direction indicated by the arrows.

As shown in the drawings:

Figure 1:
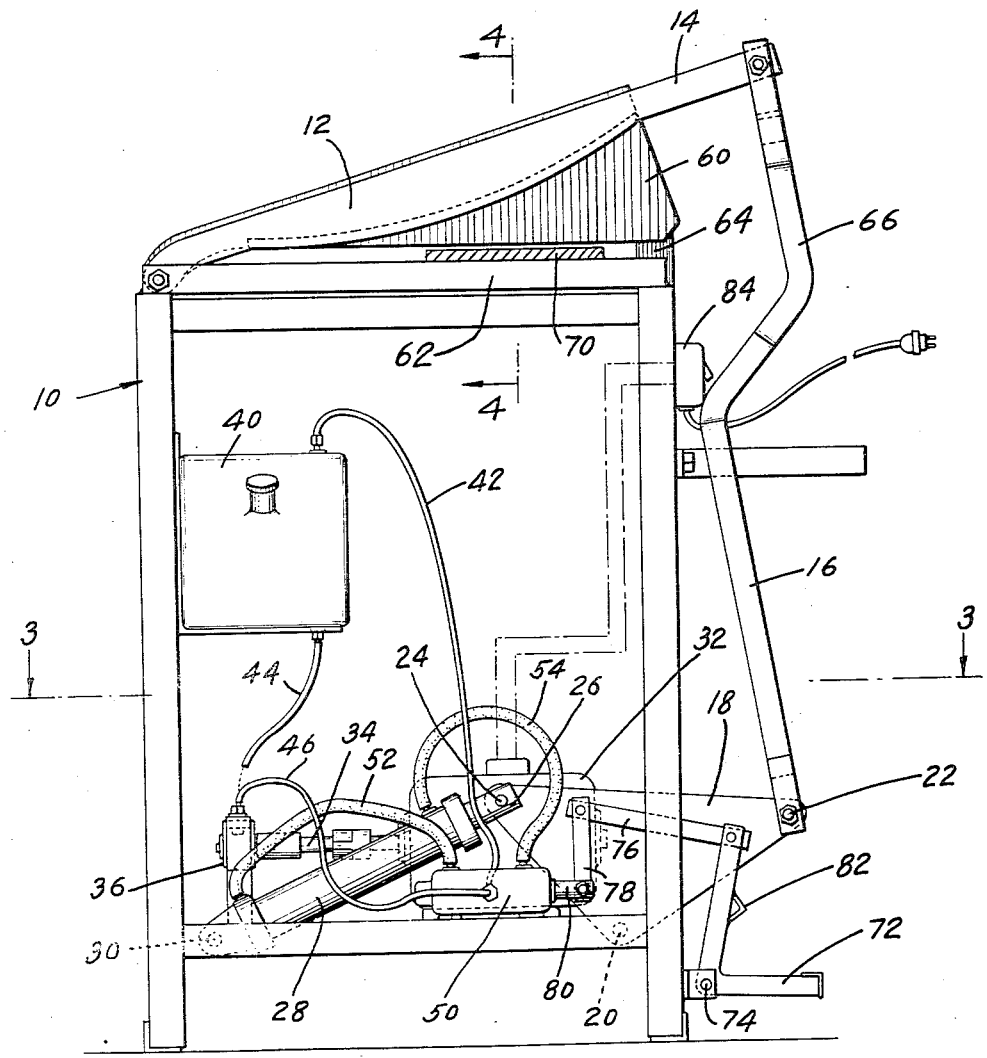
Figure 1 is a side elevation of the improved slate trimmer of this invention, showing interior construction, and with certain parts in section and illustrated diagrammatically.

The reference numeral 10 indicates generally the frame of the slate trimmer of the invention, which is preferably composed of angle iron or some suitable structural material, and is rectangular as viewed from the side, and pyramidal as viewed from the ends.

Pivotally mounted on the top of the frame 10 is a cutting blade 12, shaped as best shown in Figure 1, and this blade is provided with an integral extension 14, pivotally connected at its outer end to a link 16, which link is moved in a vertical plane by a triangular plate 18 pivotally mounted on the frame 10 at 20. The two upper corners of the triangular plate 18 are connected at 22 and 24, respectively, to the link 16 and to the end of a piston 26 in a hydraulic cylinder 28, which cylinder is, itself, pivotally mounted in the frame 10 at 30.

An electric motor or other convenient source of power 32 is fixed in the frame 10 (Figure 2), and this is connected by shaft 34 to a pump 36. This pump 36 forms part of a hydraulic system which includes a main tank or reservoir 40 and inlet and outlet tubes or conduits 42 and 44, respectively.

As best shown diagrammatically in Figure 3, the pump 36 delivers fluid under pressure by means of the pipe 46 to a control valve 50. This control valve has three lines leading therefrom indicated by the reference numerals 52, 54 and 42.

The pipe, tube or conduit 52 leads from one end of the control valve 50 to the lower end of the cylinder 28, and the other conduit or pipe 54 connects the other end of the valve 50 to the upper end of the cylinder 28, all as best shown in Figure 1.

The blade 12 is maintained in position by a brace or backing element which comprises a plate 60 fixed on the top of the frame 10, and this is important because, otherwise, a proper shearing action against the opposed cutting element 62 (Figure 3) would not result.

The brace or support 60 is held in position by a bracket 64 (Figure 2), and the link 16, which connects the blade to the operating mechanism, is offset, as shown at 66 in Figures 2 and 4, in order to allow the insertion of rather large or oversized pieces of slate, as shown by the reference numeral 70 and particularly in Figure 3.

The valve 50 is controlled by a foot pedal 72 pivoted to the frame at 74 and which is in the form of a bell-crank lever. The upper end of this is connected by links 76 and 78 to the control element 80.

From an inspection of Figure 3, it will be noted that the foot lever 72 has an extra piece of angle iron 82 welded thereon in such position that the outer end of the bell-crank may be moved downwardly by pressure of the operator's foot, and can be moved upwardly by a lifting movement of the operator's toe or part of his foot under the extension 82.

A switch 84 for controlling the operation of the motor 32 is mounted on the frame, and the entire mechanism may be enclosed in a suitable housing for safety and attractiveness.

In operation, after the motor is started, fluid is pumped from the tank 40 through the valve 50 by the pump 36 and through the lines 44 and 46. If the foot control 72—82 is in neutral position, the fluid will simply return to the tank or reservoir by way of the line 42, and no movement of the cutter will result.

A depression of the foot lever 72 will shift the valve control so that fluid will pass from the valve 50 to the lower end of the cylinder 28, moving the piston 26 upwardly and outwardly, and shifting the triangular plate 18 about its pivot point 20 to move the link 16—66 downwardly, pulling the cutter blade down at the same time. When the blade reaches the lowermost part of its movement and has severed or trimmed the piece of slate as at 70, which the operator has held in the machine, further action will automatically cease, because fluid will then be again bypassed, and the mechanism will remain in that position until the operator, by using his foot or otherwise, exerts an upward pull on the extension 82 of the bell-crank lever 72, whereupon the valve control element 80 will be moved in the opposite direction, allowing hydraulic fluid to flow from the valve to the upper end of the cylinder 28, depressing the piston and moving the mechanism back to its original position, as shown in Figure 1, where it will remain until further movement is again instigated.

A supporting platform for the pieces of slate 70 can be mounted on the top of the frame, as best shown at 90 in Figure 4, and other modifications and improvements may obviously be employed to facilitate the operation.

It will be evident that herein is provided a slate trimmer which, because of its power operation, eliminates a great deal of arduous hand work, speeds up production to a great extent, enables more accurate trimming and fitting of pieces of slate being used in flooring or roof construction work or in other phases of activity. Furthermore, the apparatus is economical of construction, composed of a minimum number of parts and, therefore, quite unlikely to get out of order or to ever require extensive repairs. Suitable material can be used in the shear blade 12 and its guard 60 so as to assure a long life of these operating parts, as also the juxtaposed shear bar 62.

I am aware that many changes may be made and numerous details of construction varied throughout a wide range without departing from the principles of this invention; and I, therefore, do not propose limiting the patent granted hereon otherwise than as necessitated by the prior art.

I claim as my invention:

1. A slate trimmer comprising a reciprocable blade, a shear mounted in operative juxtaposition therewith, power means for reciprocating the blade, said power means including a hydraulically operated piston and cylinder combination, valve means for controlling the piston movement, manually operated controls for the valve, the hydraulic means including a fluid reservoir, conduits connecting the reservoir, the cylinder and the valve, a source of power for circulating the fluid through the conduits, links connecting the blade to the piston, said links being pivotally connected to each other, to the blade and to the piston, the entire mechanism being supported in and on a rectangular frame, the blade-moving link extending from the top to the bottom of the frame, the piston-moving link being triangular in outline and pivotally connected to the blade-moving link at one corner, pivotally connected to the piston at another corner, and pivotally connected to the frame at the third corner.

2. A device as described in claim 1, wherein the blade-connected link is offset in a plane alined with the plane of the slab of slate to be cut.

3. A device as described in claim 1, wherein said manual controls comprise a bell-crank pivotally connected to the frame, links connecting the bell-crank to the valve, and two foot pedals mounted on the bell-crank, one for raising the blade and the other for lowering the same.

References Cited in the file of this patent

UNITED STATES PATENTS

| | | |
|---|---|---|
| 2,164,688 | Parsons | July 4, 1939 |
| 2,781,036 | Moerbe | Feb. 12, 1957 |
| 2,889,823 | Metzgar | June 6, 1959 |